US008825761B2

(12) United States Patent
Dunko

(10) Patent No.: US 8,825,761 B2
(45) Date of Patent: Sep. 2, 2014

(54) SYSTEMS AND METHODS FOR SHARING GROUP STATUS WITHIN A SOCIAL NETWORK

(75) Inventor: Gregory A. Dunko, Cary, NC (US)

(73) Assignee: HTC Corporation, Taoyuan, Taoyuan County (TW)

( * ) Notice: Subject to any disclaimer, the term of this patent is extended or adjusted under 35 U.S.C. 154(b) by 110 days.

(21) Appl. No.: 13/204,249

(22) Filed: Aug. 5, 2011

(65) Prior Publication Data

US 2013/0036166 A1 Feb. 7, 2013

(51) Int. Cl.
*G06F 15/16* (2006.01)
*H04L 12/58* (2006.01)
*G06Q 50/00* (2012.01)

(52) U.S. Cl.
CPC ............... *G06Q 50/01* (2013.01); *H04L 51/20* (2013.01); *H04L 51/32* (2013.01)
USPC ............................ 709/204; 455/414; 455/456

(58) Field of Classification Search
CPC ... H04L 29/00; H04L 41/08; H04L 29/08657; H04L 51/32; H04L 65/403; H04L 12/58; H04L 67/2838; H04L 51/12; H04L 51/04
USPC .................... 709/204; 455/414, 456
See application file for complete search history.

(56) References Cited

U.S. PATENT DOCUMENTS

| | | | |
|---|---|---|---|
| 6,181,928 B1 | 1/2001 | Moon | |
| 6,993,325 B1* | 1/2006 | Waesterlid | 455/414.1 |
| 7,620,902 B2* | 11/2009 | Manion et al. | 715/758 |
| 7,945,272 B2* | 5/2011 | Kim | 455/456.2 |
| 8,064,934 B2* | 11/2011 | Klassen | 455/466 |
| 2003/0045301 A1 | 3/2003 | Wollrab | |
| 2005/0143097 A1* | 6/2005 | Wilson et al. | 455/456.3 |
| 2005/0202806 A1* | 9/2005 | Bourgeois et al. | 455/416 |
| 2008/0091786 A1* | 4/2008 | Jhanji | 709/206 |
| 2008/0209011 A1 | 8/2008 | Stremel et al. | |
| 2008/0256170 A1* | 10/2008 | Hayashi et al. | 709/201 |
| 2009/0182589 A1* | 7/2009 | Kendall et al. | 705/5 |
| 2010/0157869 A1* | 6/2010 | Song | 370/312 |
| 2010/0257239 A1* | 10/2010 | Roberts | 709/204 |
| 2012/0094721 A1* | 4/2012 | Brondmo et al. | 455/566 |
| 2013/0339498 A1* | 12/2013 | Johnson | 709/221 |

* cited by examiner

*Primary Examiner* — Jonathan C Teixeira Moffat
*Assistant Examiner* — Eyob Hagos
(74) *Attorney, Agent, or Firm* — McClure, Qualey & Rodack, LLP

(57) ABSTRACT

Systems and methods for sharing group status within a social network are provided. A representative system includes a mobile device operative to: designate a set of mobile devices, each of the mobile devices being operative to communicate with others of the mobile devices and being associated with a respective member of a group of members of a social network; automatically generate group status information corresponding to a current status of the group of members; and provide the group status information to the social network.

17 Claims, 5 Drawing Sheets

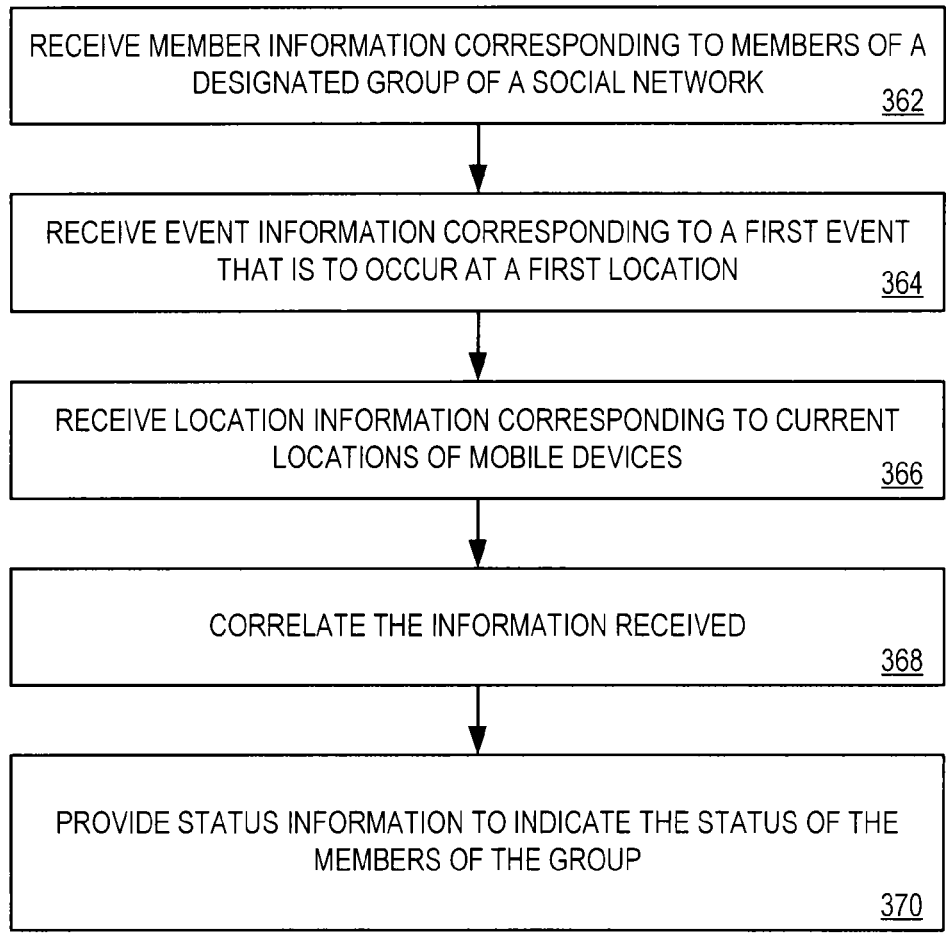

US 8,825,761 B2

SYSTEMS AND METHODS FOR SHARING GROUP STATUS WITHIN A SOCIAL NETWORK

TECHNICAL FIELD

The present disclosure generally relates to the sharing of group status within a social network environment.

BACKGROUND

Over the years, portable handheld devices such as smartphones have become prevalent. With the rapid development in communication technology, smartphones have become an integral part of many people's lives given the portability of smartphones, the convenient access to the Internet, and the growing number of applications available on smartphones. With the wide popularity of social networking, communities of users often stay connected through the Internet. Unfortunately, although the social demands for staying connected are tending to increase, there are times when meeting these demands become somewhat taxing, particularly when a user is trying to keep up with a busy schedule.

SUMMARY

Briefly described, one embodiment, among others, is a system for sharing group status within a social network that comprises a mobile device operative to: designate a set of mobile devices, each of the mobile devices being operative to communicate with others of the mobile devices and being associated with a respective member of a group of members of a social network;automatically generate group status information corresponding to a current status of the group of members; and provide the group status information to the social network.

Another embodiment is method for sharing group status within a social network comprises: designating a set of mobile devices, each of the mobile devices being operative to communicate with others of the mobile devices and being associated with a respective member of a group of members of a social network; automatically generating group status information corresponding to a current status of the group of members; and providing the group status information to the social network.

Another embodiment is a computer-readable medium having stored thereon computer-executable instructions, which, when executed by a computer processor, enable performance of the method comprising: designating a set of mobile devices, each of the mobile devices being operative to communicate with others of the mobile devices and being associated with a respective member of a group of members of a social network; automatically generating group status information corresponding to a current status of the group of members; and providing the group status information to the social network.

Other systems, methods, features, and advantages of the present disclosure will be or may become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 5-7 are flowcharts depicting alternative embodiments of methods for sharing group status.

DETAILED DESCRIPTION

Figure 1:
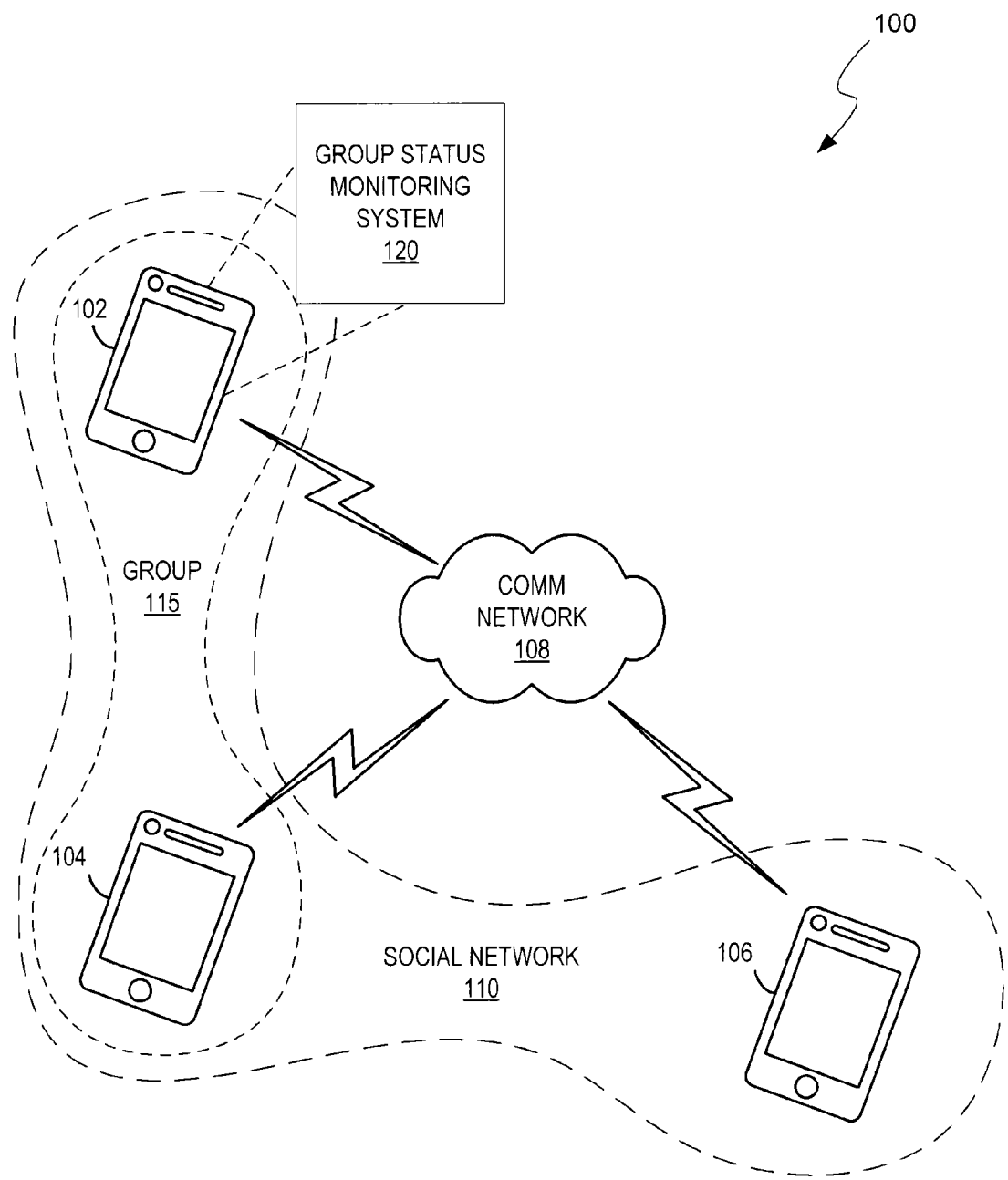
FIG. 1 is a block diagram of a networked environment in which an exemplary embodiment of a system for sharing group status within a social network is implemented.

Having summarized various aspects of the present disclosure, reference will now be made in detail to that which is illustrated in the drawings. While the disclosure will be described in connection with these drawings, there is no intent to limit the scope of legal protection to the embodiment or embodiments disclosed herein. Rather, the intent is to cover all alternatives, modifications and equivalents included within the spirit and scope of the disclosure as defined by the appended claims.

Systems and methods for sharing group status within a social network are provided that, in some embodiments, facilitate the automatic updating of status of a group of members of a social network. By way of example, a group of members that uses mobile devices can designate the mobile devices to communicate information, which can be correlated to determine if the members are in a vicinity of one another. Responsive to determining that the members of the group are in a vicinity of one another, at least one of the mobile devices can be used to provide group status information about the group. For instance, one of the mobile devices can automatically transmit group status information including the names of the group members and their current location to a social networking website. In some embodiments, a calendar of events can be accessed to provide event information (e.g., the name of an event) that can be used to form the group status information.

A description of an embodiment of a system for sharing group status within a social network will now be described followed by a discussion of the operation of various components of the system. In this regard, FIG. 1 is a block diagram of a networked environment in which an exemplary embodiment of a system for sharing group status is implemented.

As shown in FIG. 1, system 100 includes mobile devices 102, 104 and 106 communicatively coupled via a communication network 108. Each of the mobile devices may be embodied as a mobile computing device such as, for example and without limitation, a smartphone that incorporates cellular telephone functionality. Notably, the communications network can use one or more of various communications types such as, for example and without limitation, cellular and Wi-Fi communications.

Users of mobile devices 102, 104 and 106 are associated with a social network 110 that enables the users to interact with each other. Typically, a social network is facilitated by a website that may require a registration and login prior to use and may include users of devices other than mobile devices, such as computers. However, regardless of how such a social network is implemented (e.g., be it web-based or not), the functionality of concern involves the ability to provide interaction among a limited group of members, as may be established by the members themselves. For instance, one manner to add a member to a social network may involve "friending" a member, while removing a member from a social network may involve "unfriending" the member.

Various manners can be used for designating a group of members within a social network. By way of example, website login, near field communication (NFC) protocols, manual registration of mobile devices, local connectivity such as Bluetooth, WLAN, Wifi direct, etc., and forced connections, among others, can be used. For the purpose of the example presented in FIG. 1, the designated group 115 of members includes the users of mobile devices 102 and 104.

In operation, system 100 facilitates correlation of information related to activities of members of group 115 of the social network. Specifically, system 100 correlates information that identifies members of the group with location information pertaining to those members. As a result of such correlating, the system updates the status of the members of the group with respect to the social network.

The aforementioned functions can be performed by various components in various embodiments. For example, the functionality can be highly distributed across a network or less so by use of functions performed on local devices, as in the case of mobile device 102.

In this regard, mobile device 102 includes a group status monitoring system 120, which can be implemented in numerous ways such as, for example and without limitation, an application executing on the mobile device.

In operation, system 120 receives member information to identify members of a designated group of members of the social network (in this case, users of mobile devices 102 and 104). This can be accomplished in some embodiments by registering mobile devices associated with the members to the system. System 120 also receives location information corresponding to a current location of at least one of the members of the group. In this case, location information corresponding to the user of mobile device 102 is provided to system 120 by positioning capability onboard mobile device 102. In contrast, location information corresponding to the user of mobile device 104 is provided to system 120 via mobile device 102. For instance, responsive to establishing an NFC communication link between mobile devices 102 and 104, it can be presumed that the current location of mobile device 104 is in a vicinity of the current location of mobile device 102. It should be noted that various methods of determining the location of a mobile device can be used.

Using the received information, system 120 provides group status information. For example, in some embodiments, the group status information can be provided to a website associated with the social network. Additionally or alternatively, the group status information can be provided directly to mobile devices of members of the social network. Notably, the group status information can include at least one of: information regarding where at least some of the members of the group are located; or what those members are doing. In some embodiments, the group status information is automatically generated by the system and automatically provided for use by the social network.

Group status information can be provided in various formats, such as a message. Such a message may be a user-defined message; for example, "The Study Crew is at [location]", wherein "The Study Crew" represents a user-defined field and the "[location]" represents an auto-fill field that is populated based on a determined current location. By way of further example, the system may prompt the member to send a message (e.g., a user-preselected message or a "canned" message). Note that, in some embodiments, providing of group status information may be customized based upon perspective of the member. For instance, assuming members A, B and C are together, a message from member A informing others of group status may indicate "I am with B and C", whereas, a message from member B may indicate "I am with A and C".

In some embodiments, system 120 receives event information corresponding to an event that at least one of the members is scheduled to attend. For example, the event information may include a location at which the event is to occur, a time that the event is scheduled to begin, and a time that the event is scheduled to end. Such event information can be used to refine the group status information. For instance, instead of indicating that "John, Tim and Sally are in Paris", the group status information could be refined to indicate that "John, Tim and Sally are attending the Paris Airshow."

Event information can reside in various forms in various locations. For example, event information can be associated with a calendar application sync'd with the mobile device and a web-based event scheduler, among others.

Figure 2:
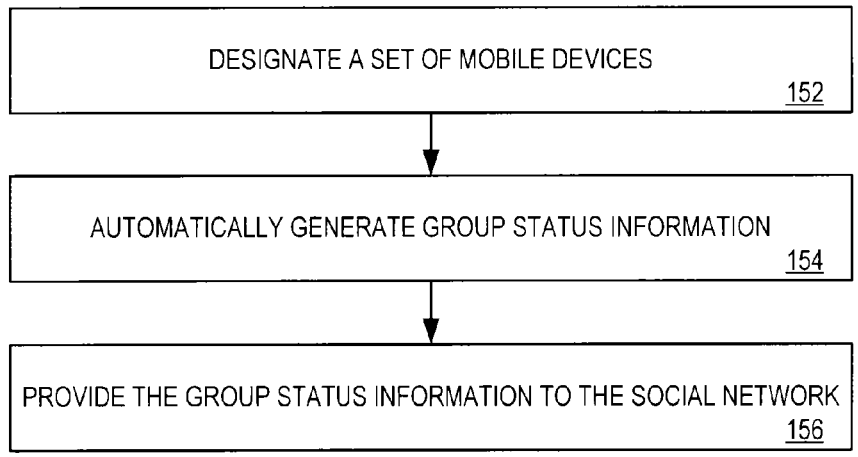
FIG. 2 is a flowchart depicting an exemplary embodiment of a method for sharing group status within a social network such as may be performed by the system shown in FIG. 1.

FIG. 2 is a flowchart depicting an exemplary embodiment of a method for sharing group status such as may be performed by system 100 of FIG. 1. As shown in FIG. 2, the method includes the step of designating a set of mobile devices, with each of the mobile devices being operative to communicate with others of the mobile devices. Additionally, each of the mobile devices is associated with a respective member of a group of members of a social network (block 152). Notably, designating of the mobile devices may be performed in various manners, such as by communicatively linking the devices when in proximity to each other, among others. In block 154, the step of automatically generating group status information corresponding to a current status of the group of members is performed. Then, in block 156, the method includes providing the group status information to the social network.

Referring back to FIG. 1, it is noted that mobile device 104 lacks a group status monitoring system. Despite the lack of such a system being resident on mobile device 104, comparable functionality may be perceived. Notably, much of the functionality can be provided by another device. In this regard, correlating member information, event information and location information for a user of mobile device 104 can be performed by system 120, which is remote from mobile device 104.

Figure 3:
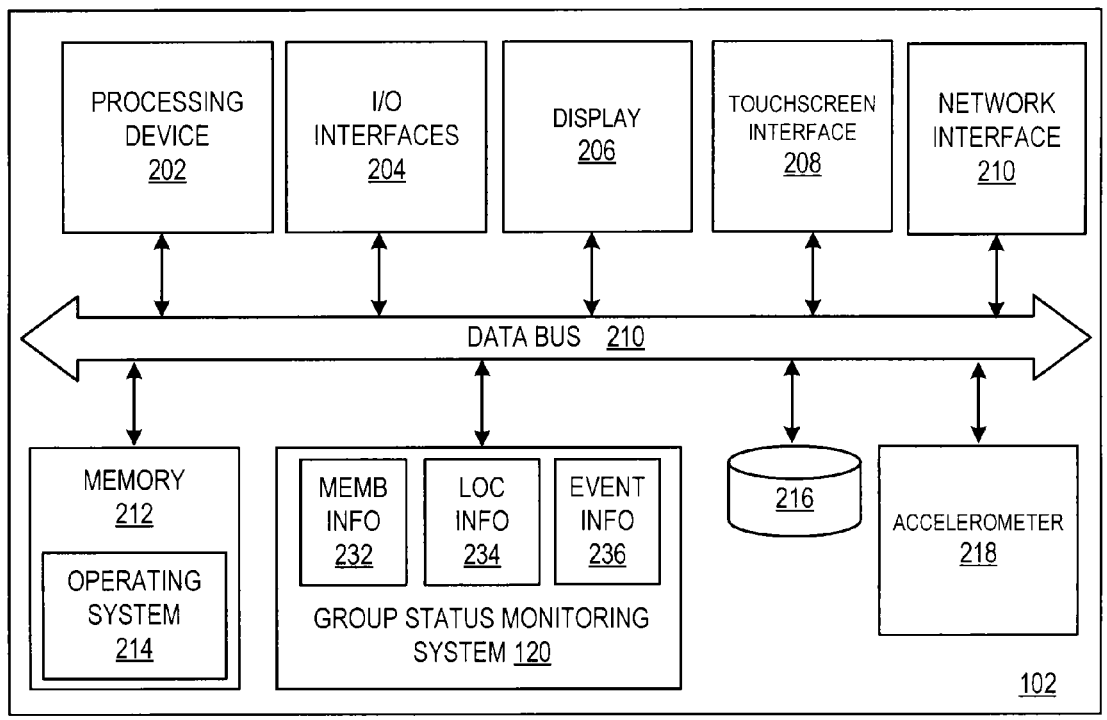
FIG. 3 illustrates an exemplary embodiment of a mobile device shown in FIG. 1.

FIG. 3 illustrates mobile device 102 shown in FIG. 1. As described earlier, mobile device 102 will typically be embodied as a smartphone but may also be embodied in any one of a wide variety of wired and/or wireless computing devices. As shown in FIG. 3, mobile device 102 includes a processing device (processor) 202, input/output interfaces 204, a display 206, a touchscreen interface 208, a network interface 210, a memory 212, and operating system 214, a mass storage 216 and an accelerometer 218, with each communicating across a local data bus 220. Additionally, mobile device 102 incorporates a group status monitoring system 120, which is depicted as including member information 232, (optionally) location information 234 and (optionally) event information 236, although the location of information 232, 234 and 236 could vary.

The processing device 202 may include any custom made or commercially available processor, a central processing unit (CPU) or an auxiliary processor among several processors associated with the mobile device 102, a semiconductor based microprocessor (in the form of a microchip), a macroprocessor, one or more application specific integrated circuits (ASICs), a plurality of suitably configured digital logic gates, and other electrical configurations comprising discrete elements both individually and in various combinations to coordinate the overall operation of the system.

The memory 212 can include any one of a combination of volatile memory elements (e.g., random-access memory (RAM, such as DRAM, and SRAM, etc.)) and nonvolatile memory elements. The memory typically comprises native operating system 214, one or more native applications, emulation systems, or emulated applications for any of a variety of operating systems and/or emulated hardware platforms, emulated operating systems, etc. For example, the applications may include application specific software which may comprise some or all the components of the mobile device 102. In accordance with such embodiments, the components are stored in memory and executed by the processing device. Note that although depicted separately in FIG. 2, event attendance monitoring system 120 may be resident in memory such as memory 212.

Touchscreen interface 208 is configured to detect contact within the display area of the display 206 and provides such functionality as on-screen buttons, menus, keyboards, etc. that allows users to navigate user interfaces by touch. For some embodiments, the mobile device 102 further comprises an accelerometer 218 configured to detect motion and vibration of the mobile device 102.

One of ordinary skill in the art will appreciate that the memory 214 can, and typically will, comprise other components which have been omitted for purposes of brevity. Note that in the context of this disclosure, a non-transitory computer-readable medium stores one or more programs for use by or in connection with an instruction execution system, apparatus, or device. With further reference to FIG. 3, network interface device 210 comprises various components used to transmit and/or receive data over a networked environment such as depicted in FIG. 1. When such components are embodied as an application, the one or more components may be stored on a non-transitory computer-readable medium and executed by the processing device.

Figure 4:
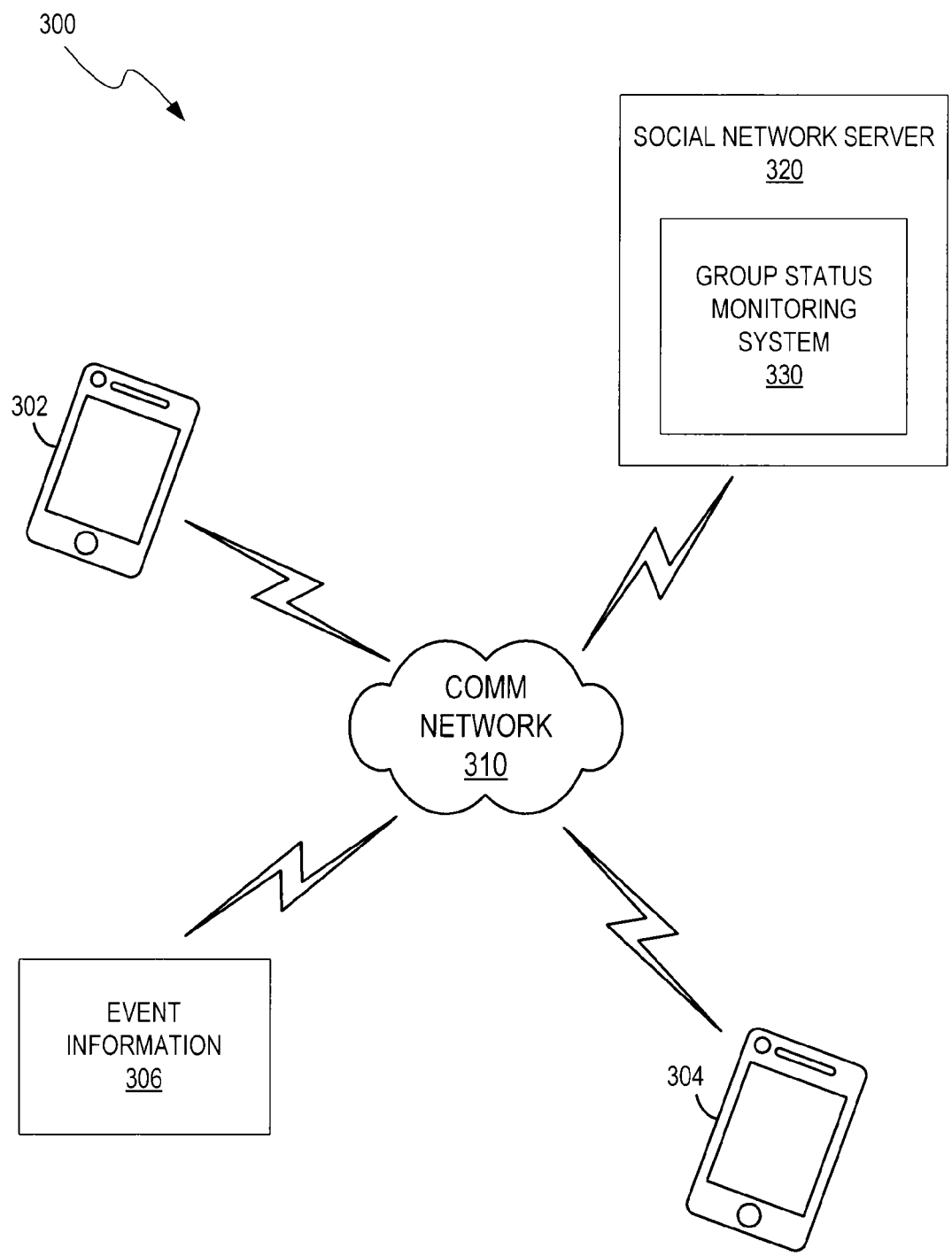
FIG. 4 is a block diagram of an alternative networked environment in which another exemplary embodiment of a system for sharing group status within a social network is implemented.

FIG. 4 is a block diagram of an alternative networked environment in which another exemplary embodiment of a system for sharing group status is implemented. As shown in FIG. 4, system 300 includes mobile devices 302 and 304 that are communicatively coupled via a communication network 310. Each of the mobile devices may be embodied as a mobile computing device such as, for example and without limitation, a smartphone that incorporates cellular telephone functionality. Notably, the communications network can use one or more of various communications types such as, for example and without limitation, cellular and Wi-Fi communications.

Users of mobile devices 302 and 304 are associated with a designated group of a social network, which enables the users to interact with each other using the mobile devices. In this embodiment, the social network is facilitated by a website that is hosted by social network server 320. As such, server 320 facilitates interaction among the members of the group.

Additionally, server 320 implements a group status monitoring system 330 that facilitates correlation of information related to activities of members of the group. Specifically, system 330 correlates information that identifies members of the group with location information and event information pertaining to those members. As a result of such correlating, members of the group can update other members of the social network regarding their activities.

In order to facilitate the aforementioned functionality, various aspects may be performed by one or more of the mobile devices 302, 304. In this case, mobile device 102 is operative to perform, at least in part, the method depicted in the flowchart of FIG. 5. Specifically, the method includes: providing member information corresponding to a member of a designated group of a social network (e.g., the member associated with mobile device 302) (block 352); and providing location information corresponding to the current location of the mobile device so that a current location of the member is determined (block 354). It should be noted that in some embodiments, a mobile device can be configured to receive event information (e.g., event information 306). Optionally, this can be accomplished by syncing with a calendar of events that resides on a different device. Notably, the member information, the location information and/or the event information can be provided to a component remote from the mobile device, such as a server implementing an embodiment of a group status monitoring system, for example.

With respect to operation of group status monitoring system 330, system 330 is operative to perform, at least in part, the method depicted in the flowchart of FIG. 6. Specifically, the method includes: receiving member information corresponding to members of a designated group of a social network (block 362); receiving event information corresponding to a first event that is to occur at a first location (block 364); receiving location information corresponding to the current locations of mobile devices associated with the members (366); correlating the information received (block 368); and providing status information to indicate the status of members of the group (block 370). In some embodiments, providing status information includes updating the posted status of the members at a social network website.

Additionally or alternatively, based on a determination of which of the members of the group are present at a location and whether those members constitute a threshold number of the members, the system may be configured to send group status information to the mobile devices of those members that are not present at the location. Notably, the threshold number may be established based on various criteria, such as the size of the group, the type of group or can be user selected.

Information (e.g., event information) can be received from various components for use by a group status monitoring system. For instance, event information 306 (which is associated with the user of mobile device 302) is not provided to group status monitoring system 330 by mobile device 302. In this case, event information 306 is resident on a separate component. By way of example, event information can be stored for calendar application that is not synced with mobile device 302, in memory associated with the social network server that is associated with scheduling functionality, among others.

Figure 7:
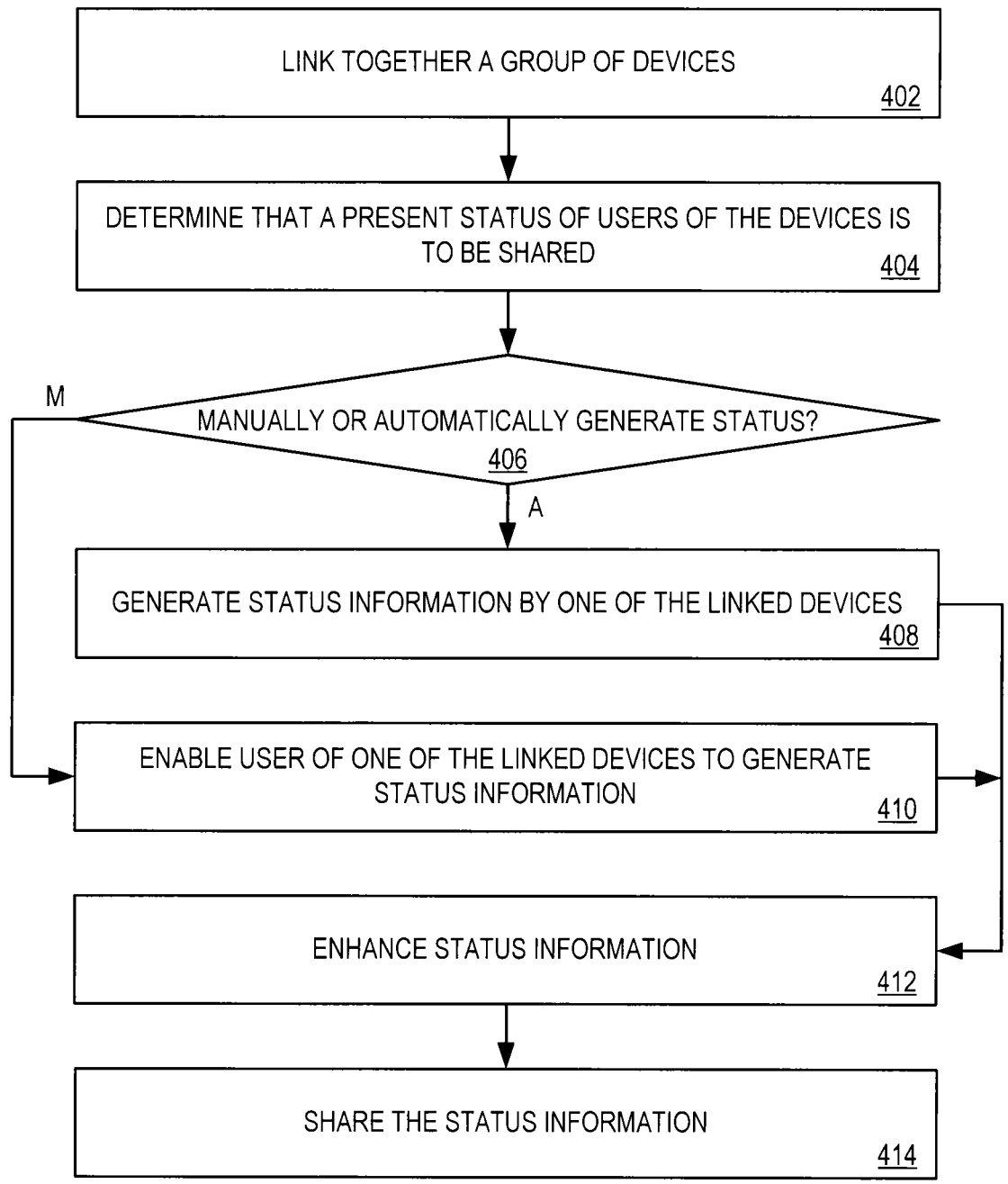

FIG. 7 is a flowchart depicting another exemplary embodiment of a method for sharing group status. As shown in FIG. 7, the method includes the steps of: linking together a group of devices that are able to communicate with each other (block 402); determining that a present status (e.g., location) of at least one of the users of the devices is to be shared (block 404); and, in response to determining that the status is to be shared, determining whether status information is to be manually generated or automatically generated (block 406). If it is determined in block 406 that status information is to be automatically generated, such status information is generated by one of the linked devices (block 408); however, if the status information is to be manually generated, a user of one of the linked devices is enabled to generate the status information (block 410). Optionally, manually generating status information could be in response to a prompt provided by one of the linked devices. Thereafter, such as depicted in block 412, status information may be enhanced, such as by appending member information to identify those members that are presently gathered, and the status information is shared on a social network (block 414). In some embodiments, this is accomplished by updating the status of each of the members on a website.

It should be noted that, in some embodiments, status of one or more members may be determined by sensing that several members are together and intuitively determining an activity the members are engaged in. For instance, if members A, B and C are located on a bike trial and are moving together at approximately 10 mph, status information may be generated indicating that "A, B and C are bicycling". In other embodiments, once a group of members is sensed, one or more of the members may be prompted to update the status information.

If embodied in software, it should be noted that each block depicted in the flowcharts represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as the mobile device 102 shown in FIG. 1. The machine code may be converted from the source code, etc. If embodied in hardware, each block may represent a circuit or a number of interconnected circuits to implement the specified logical function(s). Additionally, although the flowcharts show specific orders of execution, it is to be understood that the orders of execution may differ.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A system for sharing group status within a social network, comprising:
    a first mobile device operative to:
    designate, by the first mobile device, a set of other mobile devices as being associated with a group of members of the social network via a direct connection with each of the other mobile devices, wherein the direct connection is a communication connection that passes between devices without passing through an intermediate device, each of the first and the other mobile devices being operative to communicate directly with others of the mobile devices and being associated with a respective member of the group of members of the social network, the first mobile device being a member of the social network;
    determine, by the first mobile device, a current location of a first member of the group of members;
    automatically generate, by the first mobile device, group status information corresponding to a current status of the group of members, wherein the group status information comprises location information corresponding to the current location; and
    provide, by the first mobile device, the group status information to the social network, wherein the first mobile device is operative to receive event information corresponding to a first event associated with an electronic calendar and to use the event information in automatically generating the group status information by correlating the event information with the current location.

2. The system of claim 1, wherein the group status information comprises an identification of a location and an identification of members of the group present at the location.

3. The system of claim 2, wherein the first mobile device is operative to provide group status information responsive to determining that a threshold number of the members of the group are present at a given location.

4. The system of claim 3, wherein the first mobile device is further operative to automatically send group status information to the others of the members not present at the given location for receipt by respective mobile devices of the others of the members.

5. The system of claim 1, wherein the first mobile device is a smartphone.

6. The system of claim 1, further comprising a social network server operative to facilitate communication between the members via web-based interaction.

7. The system of claim 1, wherein the group status information is configured as a user-defined message.

8. A method for sharing group status within a social network, comprising:
    designating, by a first mobile device, a set of mobile devices as being associated with a group of members of the social network via a direct connection with each of the other mobile devices, wherein the direct connection is a communication connection that passes between devices without passing through an intermediate device, each of the first and the other mobile devices being operative to communicate directly with others of the mobile devices and being associated with a respective member of the group of members of the social network, the first mobile device being a member of the social network;
    automatically generating, by the first mobile device, group status information corresponding to a current status of the group of members by automatically correlating a current location with event information, wherein the group status information comprises location information corresponding to the current location of at least the first of the mobile devices; and
    providing, by the first mobile device, the group status information to the social network via at least the first of the mobile devices.

9. The method of claim 8, wherein automatically generating group status information comprises determining a current location of each of the members via respective ones of the mobile devices.

10. The method of claim 8, wherein
    the event information corresponds to events for which at least one of the members is scheduled such that, if the current location corresponds to an event location at which a first of the events is scheduled, the group status information includes information corresponding to the first of the events.

11. The method of claim 10, further comprising accessing a first calendar of events stored on a first of the mobile devices to obtain the event information.

12. The method of claim 8, wherein providing the group status information to the social network comprises automatically sending a message from one of the mobile devices.

13. The method of claim 8, wherein designating a set of mobile devices comprises registering the mobile devices with the social network as being associated with the group of the members.

14. The method of claim 8, wherein designating a set of mobile devices comprises communicating group information associated with members of the group among the mobile devices.

15. A non-transitory computer-readable medium having stored thereon computer-executable instructions, which, when executed by a computer processor of a first mobile device in a social network, enable performance of the method comprising:

designating, by the first mobile device, a set of mobile devices as being associated with a group of members of the social network via a direct connection with each of the other mobile devices, wherein the direct connection is a communication connection that passes between devices without passing through an intermediate device, each of the mobile devices being operative to communicate directly with others of the mobile devices and being associated with a respective member of the group of members of the social network, the first mobile device being a member of the social network;

automatically generating, by the first mobile device, group status information corresponding to a current status of the group of members by receiving event information corresponding to a first event associated with an electronic calendar and using the event information to generate the group status information by correlating the event information with the current location, wherein the group status information comprises location information corresponding to a current location of at least one of the members; and providing, by the first mobile device, the group status information to the social network.

16. The system of claim 1, wherein the first mobile device is operative to designate the set of mobile devices as being associated with the group of members of the social network using Near Field Communication (NFC).

17. The method of claim 8, wherein designating a set of mobile devices comprises using Near Field Communication (NFC) among the mobile devices of the set.

* * * * *